(12) United States Patent
Christodoulou et al.

(10) Patent No.: US 7,778,804 B2
(45) Date of Patent: Aug. 17, 2010

(54) NETWORK SYSTEM ANALYSIS

(75) Inventors: Athena Christodoulou, Bristol (GB);
Richard Taylor, Bristol (GB);
Christopher Tofts, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2137 days.

(21) Appl. No.: 10/299,394

(22) Filed: Nov. 19, 2002

(65) Prior Publication Data

US 2003/0097245 A1 May 22, 2003

(30) Foreign Application Priority Data

Nov. 20, 2001 (GB) ................. 0127725.0

(51) Int. Cl.
*G06F 7/60* (2006.01)
*G06F 17/10* (2006.01)

(52) U.S. Cl. .......................................... 703/2

(58) Field of Classification Search ............ 703/22
See application file for complete search history.

(56) References Cited

U.S. PATENT DOCUMENTS

| 5,561,841 | A | * | 10/1996 | Markus ....................... 455/446 |
| 5,794,128 | A | * | 8/1998 | Brockel et al. ........... 455/67.11 |
| 5,878,420 | A | | 3/1999 | de la Salle |
| 5,960,439 | A | | 9/1999 | Hamner et al. |
| 6,209,033 | B1 | * | 3/2001 | Datta et al. ................. 709/224 |
| 6,286,047 | B1 | | 9/2001 | Ramanathan et al. |
| 2002/0022952 | A1 | * | 2/2002 | Zager et al. .................... 703/22 |

FOREIGN PATENT DOCUMENTS

| EP | 0595440 A2 | 5/1994 |
| GB | 2371708A A | 7/2002 |
| WO | WO 93/10495 | 5/1993 |
| WO | WO 96/13107 | 5/1996 |
| WO | WO96/13107 A1 | 5/1998 |
| WO | WO 98/26541 | 6/1998 |

\* cited by examiner

*Primary Examiner*—Kamini S Shah
*Assistant Examiner*—Saif A Alhija

(57) ABSTRACT

Apparatus for producing an electronic model of a communications network or system having at least one host and a plurality of nodes connected thereto, directly or otherwise, the apparatus comprising means for obtaining data relating to at least some of the nodes and/or the host and means for creating an electronic model of the system or network using the data. The apparatus comprises a trusted computer host for use in analysing the network. The trusted computer host comprises means for detecting nodes on the network. As nodes are detected, sampling probes are inserted at each such node wherever possible. The probes take measurements at the respective nodes and return the resultant data to the trusted computer host. For a case where it is not possible to insert a probe at a detected node, the trusted computer host comprises means for performing traffic analysis and obtaining a profile of behavior between that node and the network host. The data received from the probes and the traffic analysis data is used by model simulation means in the trusted computer host to create a model of the network.

10 Claims, 1 Drawing Sheet

NETWORK SYSTEM ANALYSIS

FIELD OF THE INVENTION

This invention relates to system analysis and, in particular, to the architectural evaluation and future capacity planning in respect of a communications system or network having at least one host and a plurality of nodes connected thereto, directly or otherwise,

BACKGROUND TO THE INVENTION

There are many circumstances in which it is required to monitor and analyse the operation of systems, so that, for example, any potential problems can be identified and solved, and predictions regarding future operation of such systems can be made. For example, it may be required to monitor the operation of a computer network consisting of tens, hundreds or even thousands of computer stations, having many points of control.

One known method of achieving this analysis is to build an electronic model of the system using manual identification of the system architecture. In other words, an operator identifies the system architecture including its host and all nodes connected thereto and creates an electronic model of the entire system accordingly. In order to run such a system model, it is necessary to obtain measurements directly from the real system, and use these to run the model. The measurements taken will depend largely on what information is required to be obtained from the model. For instance, in one arrangement, such measurements may be obtained by tracking all data packets being transported around the real system and between nodes. As a particular example, in a trusted computer platform, the measurements may comprise round trip times of all packets being transported through the system.

Once the model is being run using measurements or data obtained from the real system, it can be manipulated to investigate various factors, including a reaction to a failure at certain points in the system, the effect of a failure of a certain length of time and/or level, possibly depending on the current load on the system, and the cost implications of such a failure, as well as future capacity requirements and their effects on the operation of the system.

However, there are a number of problems associated with this type of manual identification of system architecture and building of a network model. Firstly, it is prone to error as it can be extremely difficult to accurately identify the network architecture. Secondly, it is difficult and time-consuming to keep it up to date. In any event, the resultant model may be cumbersome in the sense that it can often become as complicated as the system it is intended to represent. Finally, the method described above may not be suitable as analysis methodologies and requirements change.

We have now devised an arrangement which overcomes the problems outlined above.

SUMMARY OF THE INVENTION

Thus, in accordance with the present invention, there is provided an apparatus for producing an electronic model of a communications network or system having at least one host and a plurality of nodes connected thereto, directly or otherwise, the apparatus comprising a detection apparatus for determining the presence of and identifying nodes in the network or system, a data collection system for obtaining data relating to at least some of said nodes and a modelling apparatus for creating an electronic model of said system or network using said data.

A "node" in the context of the present invention will be understood to mean only an intermediate or endpoint telecommunications device included in the telecommunications network, which can communicate with one or more of the other devices in the network and/or the host.

Thus, instead of manually identifying the system architecture, creating a model of the system and then using data from the real system to run the model, the present invention uses data gathered from the system to create and run a model thereof (without having to manually identify the system architecture in the first place). By using network data to automatically generate a model of the network, a user can be sure that the model is up-to-date. The model may be translated into a plurality of representations for differing analysis purposes, including capacity planning, quality of service issues, investigation of fault consequences, impending critical timing excess, etc.

In a preferred embodiment of the invention, the apparatus comprises inserting sampling probes (wherever possible) at the identified nodes for taking measurements therefrom. For the case where it is not possible to insert a probe at a node, the apparatus preferably comprises means for performing traffic analysis or the like at that node in order to obtain a profile of its behaviour relative to the host (and vice versa). The data returned from either the sampling nodes or the traffic analysis is used to construct a model of the network, which may be simulated (for example, through a Demos 2000 simulation environment or the like) and/or translated into some other format for analysis (for example, Petri Nets/Queue Analysis or the like).

The apparatus knows which probe (and therefore which node) data is received from and/or which point in the system the traffic analysis relates to, and the apparatus uses the data itself and the location in the system from which it is obtained to create a model from the system and update it as required.

Live or real-time data is preferably continuously applied to the model in order to maintain it up-to-date. The model is preferably run in super real time (i.e. faster than the system under consideration would behave) to facilitate fault analysis, fault/QoS failure, and capacity planning. In any event, the apparatus preferably comprises means for analysing the model and for providing information relating to any problems identified within the system, future capacity requirements, and/or the effect of any future system load changes.

BRIEF DESCRIPTION OF THE DRAWINGS

An embodiment of the present invention will now be described by way of example only and with reference to the accompanying drawing which is a schematic block diagram of apparatus according to an exemplary embodiment of the present invention.

DETAILED DESCRIPTION OF THE INVENTION

Figure 1:
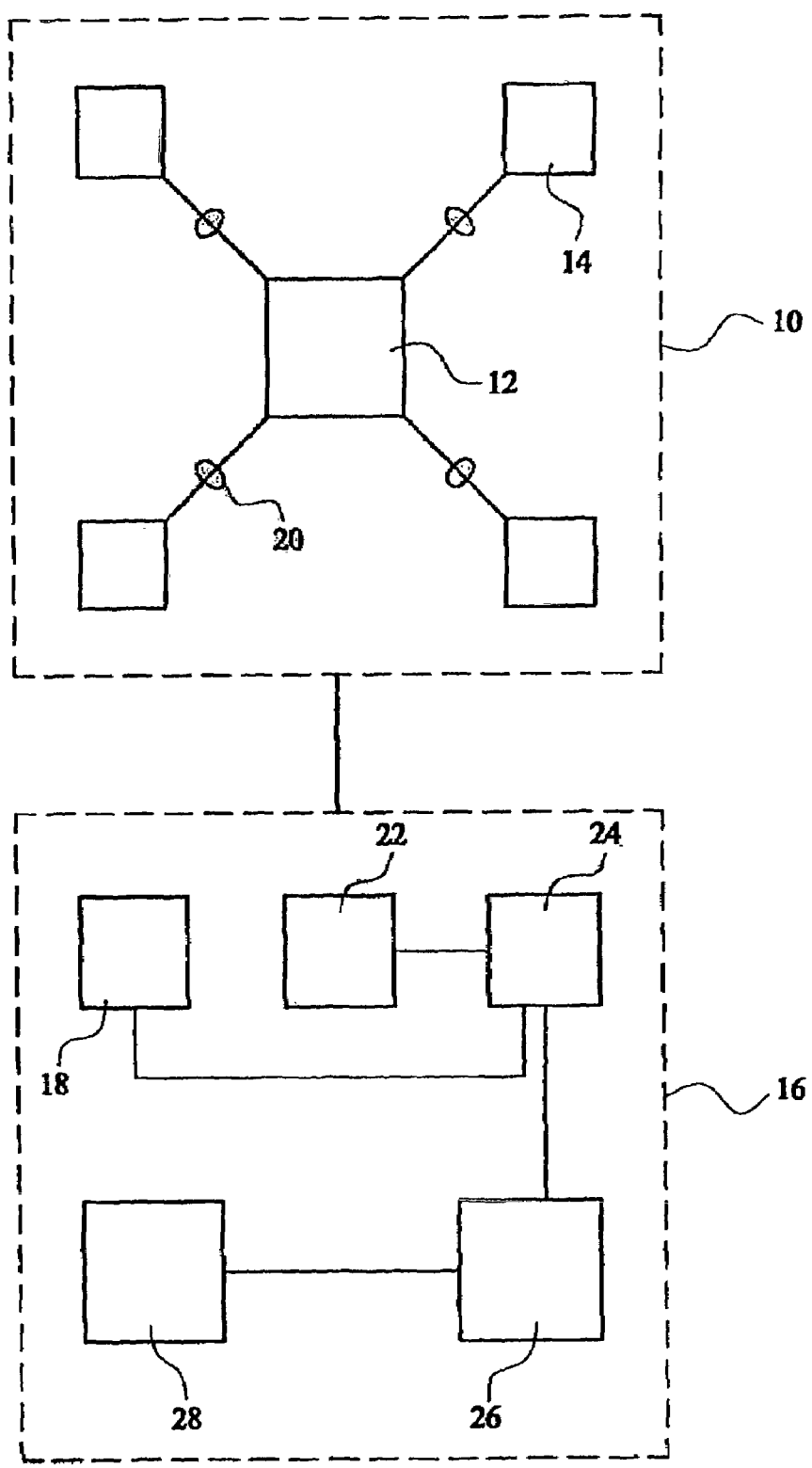

As shown in FIG. 1, a typical communications network 10 comprises at least one computer host 12 and a plurality of computing stations or nodes 14 connected thereto. An apparatus according to an exemplary embodiment of the present invention comprises a trusted computer host 16 for use in analysing the network 10. The concept of a trusted computer platform is described in detail in the applicant's co-pending application WO00/48063—in essence, a trusted computer platform is one which the user can reply upon to behave in a predictable manner without subversion. While advantageous to use a trusted computer platform as host, this is not essential to practice of the invention. The trusted computer host 16 comprises means 18 for detecting nodes 14 on the network. There are many different means currently available and widely known in the art for detecting nodes on a network. One of the most common and widely known is referred to in the art as "PING", which is short for "Packet Internet Groper". PING is generally implemented as a software application which can be used to determine whether a specific node (or IP) address is accessible, and works by sending a packet to the specified address and waiting for a reply. The application can identify the addresses of the nodes on the network from a predefined table of such addresses which may be available via the host. In this case, it simply identifies those which are accessible in the above-described manner. However, some versions of this type of application can identify the addresses of nodes in the network either from analysis of the headers of packets being transmitted between the nodes and the host, and/or by interrogating the router(s) governing such packet transmission.

As nodes 14 are detected, sampling probes 20 are inserted at each such node 14 wherever possible. The probes 20 take measurements at the respective nodes and return the resultant data to the trusted computer host 16. Again, there are a number of applications currently available for inserting sampling probes at each node (wherever possible) of the network. One such application is provided by the HP Open View Network Node Manager and generates by detecting devices in a network and their relative layout (similar to the "PING" function defined above). In addition, however, the application can be configured to monitor selected network connections, i.e. insert "sampling probes" to collect required data from such connections. The data collected will depend upon the network analysis being performed. As a simple example, the application can be configured to monitor each network connection and collect data indicating the number of packets travelling across that connection, for use in capacity determination and planning. However, it can also be configured to collect additional data, such as the types of packet travelling across the probed connection(s), for use in more complex network analysis. As such, it will be appreciated that the term "probe" in the context of the present invention refers to the insertion of some type of monitoring function at a node to collect selected data.

For the case where it is not possible to insert a probe 20 at a detected node 14, the trusted computer host 16 comprises means 22 for performing traffic analysis and obtaining a profile of behaviour between that node 14 and the network host. 12. The traffic analysis to obtain a profile of behaviour between a node (at which no probe can be inserted) and the host can be performed in a number of different ways known in the art. One such method of traffic analysis involves the collection of data defining the traffic between the node and the host, e.g.

AABABBAAABABAABAA ... etc. (up to 1000 symbols or more)

where A denotes the transmission of a packet from the host to the node and B denotes the transmission of a packet from the node to the host; calculating a number of predefined parameters computed from the collected data and defining a probability distribution representing the profile of behaviour between the node and the host. One specific method involves the definition of a phase distribution model of the collected data to represent the required profile of behaviour, as described in detail in references such as: (1) M. F. Neuts, "Matrix-Geometric Solutions in Stochastic Models", John Hopkins University Press, 1981; (2) M. F. Neuts, "Structural Stochastic Matrices of M/G/1 Type and their Applications", Marcel Dekker, 1989; (3) M. F. Neuts, "Matrix Geometric Solutions in Stochastic Models, Dover Publications, 1995.

The resultant model gives a relatively compact model representative of the flow of traffic between the node and the host and, as such, a relatively accurate representation of the profile of behaviour between the two.

The data received from the probes 20 and the traffic analysis data is used by model simulator means 24 in the trusted computer host 16 to create a model of the network 10. A super real-time simulator controller 26 is used to run the model. The model simulator means may comprise any known such means, similar for example, to the "Paramics" traffic simulator. This type of simulator enables real-time simulation of road networks and the associated traffic thereon, and can be used to model highly confessed networks and Intelligent Transportation Systems infrastructures. In addition, such known simulators include the ability to run the model in super-real time (i.e. faster than real time). Similar simulators are known in the fields of air traffic control, public transport, and drainage systems, and the same principles can be applied to the simulator for use in the present invention.

In general, as stated above, simulation in the case of the present invention may be accomplished in many ways, however one of the more common mechanisms for simulating the behaviour of a group of components within a network is "discrete event" simulation. A simple example of such a system is given below.

Each object within the system may be represented as an automaton that reacts to (a) changes in time and (b) interactions with other objects within the system. The simulator maintains a master "clock" and a list of events with their associated times of execution. The simulator operates by continuously advancing the clock to the "next event" to occur and advancing each automata in order to represent the effect of the event. Thus arbitrary period of system activity can be represented. Since the simulation is almost always simpler than the system being simulated, in many cases it is possible to run the simulator faster than real time, i.e. super-real time, where one second of simulation time (say) may represent many hours of real system time.

In addition, live or real time data obtained from the network is fed to the controller 26 to update the model. Means 28 are also provided for automatically analysing the network 10 as a whole and/or various points therein in order to identify faults, analyse the effect of potential faults and provide information regarding future capacity requirements and the effect of any future change in load on the network. Such analysis features are also available in known network simulators, and the principles applied therein can be applied in the apparatus of the present invention.

In the foregoing specification, the invention has been described with reference to specific exemplary embodiments thereof. It will, however, be apparent to a person skilled in the art that various modifications and changes may be made thereto without departing from the broader spirit and scope of the invention as set forth in the appended claims. Accordingly, the specification and drawings are to be regarded in an illustrative, rather than a restrictive, sense.

The invention claimed is:

1. Apparatus for producing an electronic model of a communications network, the apparatus comprising:
    a data collection system for obtaining data relating to probes inserted at a plurality of first network nodes and using the probes to obtain network data for those nodes,
    a traffic analysis arrangement for analysing, from an external location, traffic to and from one or more second nodes in which probes are not inserted; using the traffic analysis to calculate at least one predefined parameter; and using the at least one parameter to define a probability distribution representing a behaviour profile between the second nodes and the external location; and modelling apparatus for creating an electronic model of said network by combining said data collected from the first nodes and the behaviour profile.

2. Apparatus according to claim 1, wherein the model may be translated into a plurality of representations for differing analysis purposes.

3. Apparatus according to claim 1, being arranged to determine presence of and identifying nodes in the network and to insert sampling probes at said identified nodes in parts of the network for taking measurements therefrom.

4. Apparatus according to claim 3, wherein the data returned from either the sampling nodes or the traffic analysis is used to construct a model of the network, which may be simulated and/or translated into some other format for analysis.

5. Apparatus according to claim 1, arranged to supply live or real-time nodal data to the modelling apparatus so that the model can be updated to reflect a current state of the network.

6. Apparatus according to claim 1, comprising a system for running the model in super real time to facilitate one or more of fault analysis, fault/Qos failure, and capacity planning.

7. Apparatus according to claim 1, comprising analysis apparatus for analysing the model and for providing information relating to problems identified within the network, future capacity requirements, and the effect of any future system load changes.

8. A method of modeling a network comprising the steps of:

inserting probes at a plurality of first network nodes and using the probes to obtain network data for those nodes;

analysing, from an external location, traffic to and from one or more second nodes in which probes are not inserted;

using the traffic analysis to calculate at least one predefined parameter and using the at least one parameter to define a probability, distribution representing a behaviour profile between the second nodes and the external location; and combining the data collected from the first nodes and the behaviour profile to create a model of the network.

9. A method according to claim 8 further comprising the step of running the model in super-real time.

10. A method according to claim 8 wherein the model is analysed to provide information relating to problems identified with the network, future capacity requirements, and the effect of any future system load changes.

* * * * *